United States Patent [19]

Halpern

[11] 4,341,694
[45] Jul. 27, 1982

[54] INTUMESCENT FLAME RETARDANT COMPOSITIONS

[75] Inventor: Yuval Halpern, Skokie, Ill.

[73] Assignee: Borg-Warner Corporation, Chicago, Ill.

[21] Appl. No.: 280,569

[22] Filed: Jul. 6, 1981

[51] Int. Cl.³ ............................................. C08K 5/00
[52] U.S. Cl. .................................... 252/606; 521/85; 521/907; 524/117; 523/179
[58] Field of Search ................ 260/45.8 NT, 45.8 R, 260/45.9 NC, 45.9 AM, 45.95 P; 521/85, 907

[56] References Cited

U.S. PATENT DOCUMENTS

| | | | |
|---|---|---|---|
| 3,873,496 | 3/1975 | Hills | 260/45.8 R |
| 3,936,416 | 2/1976 | Brady | 260/42.18 |
| 4,154,930 | 5/1979 | Halpern | 544/195 |
| 4,201,705 | 5/1980 | Halpern | 260/45.8 NT |

OTHER PUBLICATIONS

H. L. Vandersall, "Intumescent Coating Systems, etc", Apr. 1971, J. Fire & Flammability, 2, 97–139, (1971).

Primary Examiner—Morton Foelak
Attorney, Agent, or Firm—Richard J. Schlott

[57] ABSTRACT

Compositions comprising 2,6,7-trioxa-1-phosphobicyclo [2.2.2.] octane -4-methanol-1-oxide and a nitrogen compound selected from the group melamine, ammeline, benzoguanidine, guanidine, urea and salts thereof, are intumescent and are readily adapted to flame retard a variety of dissimilar resins including polyolefins, polyvinylaromatic resins, polycarbonates, polyacrylates, polyamides, PVC and blends thereof.

2 Claims, No Drawings

INTUMESCENT FLAME RETARDANT COMPOSITIONS

BACKGROUND OF THE INVENTION

This invention relates to intumescent compositions and more particularly to intumescent compositions comprising a bicyclic phosphate compound and a compound of nitrogen. The intumescent compositions of this invention impart flame retardant and intumescent character to polymers.

Intumescent compositions may be generally described as those compounds and mixtures which swell upon heating to produce a voluminous char or residue. A familiar example of such compositions is mercuric thiocyanate or "pharaoh's serpents" which, when ignited, forms a voluminous ash that resembles a moving serpent. Other compositions have been formulated which combust to form adherent, tough insulating foams that resist further burning and act to insulate and protect the underlying substrate. These formulations have found wide commercial use in fire retardant paints and mastics.

More recently, additives have been incorporated into molding resins which render them intumescent and flame retardant. In U.S. Pat. Nos. 3,936,416 and 4,201,705 there are described polyolefin compositions containing melammonium polyphosphates and phosphate esters which are flame retarded. Upon combustion, a tough, insulating char forms at the surface of the molded article which resists further burning and acts to protect the bulk of the polyolefin resin from further burning.

As is well known in the art, the behavior of flame retardant additives in resin formulations varies greatly with the nature of polymeric substrate. This is particularly true with intumescent compositions since the rapid formation of the protective char layer is highly dependent upon such factors as the combustion temperature and the viscosity of the melt formed by the burning substrate. Other considerations that may also come into play even where the intumescent behavior is optimum include the effect of the additive on the physical properties, color and molding characteristics of the base resin. The development of intumescent additives for use in flame retarding resins thus remains a highly empirical art wherein predictability of behavior is rare to nonexistent, and the art has largely concentrated on the development of highly specific additive combinations for particular resins and end-uses.

The development of an intumescent additive combination which exhibits a greater latitude in dispersability and char-forming character and thus capable of being formulated for use in a wider variety of dissimilar resins would thus be a useful advance in the flame retardant art.

SUMMARY OF THE INVENTION

The present invention is an intumescent additive combination comprising a bicyclic phosphate compound and a compound of nitrogen. More particularly, the invention is an intumescent composition comprising 2,6,7-trioxa-1-phosphabicyclo[2.2.2.]octane-4-methanol-1-oxide (PEPA) and a compound of nitrogen. The composition may be formulated to impart a degree of flame retardant and intumescent character to a variety of polymers.

DETAILED DESCRIPTION OF THE INVENTION

The bicyclic phosphate compound, PEPA, which may be represented by the formula:

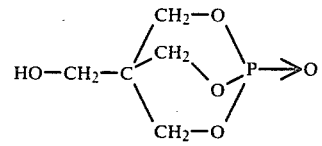

is a known phosphate compound and may readily be prepared by conventional processes as is disclosed in U.S. Pat. No. 3,293,327. PEPA has been disclosed for use as a flame retardant in polyesters and particularly in polyester fibers as is set forth in U.S. Pat. No. 3,873,496, however PEPA alone is not an intumescent additive for polyesters and is described by the patentee as a thermally stable flame retardant and unreactive with molten polyesters.

The bicyclic phosphate compound PEPA is used with a nitrogen compound to provide an intumescent composition. A wide variety of nitrogen compounds are effective when used with PEPA for producing intumescent properties, and particularly useful are ammonium compounds and derivatives of ammonia including amines, ureas, guanidines, guanamines, s-triazines such as melamine and ammeline, amino acids and peptides, as well as salts and derivatives thereof. More preferable are the amino-s-triazines such as melamine, ammeline and benzoguanamine and salts thereof, urea, guanidine and salts thereof and ammonium salts including ammonium phosphate and ammonium polyphosphate.

The intumescent compositions of this invention comprise mixtures of from 5 to 95 wt. % PEPA and from 95-5 wt. % of the nitrogen compound. The specific ratio employed will depend in part upon the particular nitrogen compound employed, in as much as the various nitrogen compounds are not equally effective in producing intumescent behavior.

The intumescent compositions of this invention, when further compounded with a polymeric resin will impart flame retardant and intumescent character. Polymers which exhibit intumescent behavior when compounded with a sufficient amount of an intumescent composition of this invention include polyolefins, polyvinylaromatic resins such as polystyrene and styreneacrylonitrile copolymers, ABS graft copolymers, polycarbonate resins such as bisphenol-A polycarbonate, polyacrylate resins such as polymethyl methacrylate polyamides such as Nylon 6, and polyvinylchloride, as well as blends and alloys of these resins. As would be expected, not every intumescent combination of PEPA and nitrogen compound is effective in producing a desirable level of intumescence in every polymeric resin, and one skilled in the art will recognize the need for evaluating and selecting particular combinations for particular end uses. In general when employed at levels above about 20 parts by weight of intumescent composition per hundred parts by weight of resin, intumescent characteristics will be present. The degree of intumescence will increase with increased levels of intumescent additive compositions, and for some purposes, the including of as much as 60 parts by weight of intumescent composition per hundred parts by weight of resin may be preferred.

The compounding of the polymer with the intumescent composition may be accomplished by any of the conventional compounding processes including powder blending, Banbury mixing, melt extrusion and the like. Those skilled in the art will recognize that the particular intumescent composition selected for use with a particular resin will necessarily be stable at the processing temperature when melt processing is to be carried out. Where it is desired to use compositions which decompose at or near the melt temperature of the resin, powder blending and compression molding may be employed to minimize premature decomposition and intumescing.

The preparation of the intumescent compositions of this invention and the use of such compositions in flame retardant resins will be better understood by consideration of the following examples, which are provided to further illustrate the practice of this invention and not by way of limitation.

The Limiting Oxygen Index (LOI) test is employed to determine the minimum concentration of oxygen, in percent, which will support combustion of a test sample. The test is more fully described in ASTM-D-2863-70.

The UL-94 flame test is a standard test for rating the vertical burn characteristics of a test sample.

EXAMPLES 1–16

In the following Examples, 1:1 mixtures of PEPA and the indicated nitrogen compound were prepared by simple mixing of the powdered and/or liquid compounds. The mixtures were tested for intumescent behavior by placing a sample on the tip of a laboratory spoon and exposing the sample to a bunsen burner flame for 5 to 10 sec. The compositions of the mixtures and their respective intumescent behavior are summarized in Table I.

TABLE I
Intumescent Character of 1:1 PEPA/Nitrogen Compound Mixtures

| Example No. | Nitrogen Compound | Intumescent Behavior |
| --- | --- | --- |
| 1 | Melamine | + |
| 2 | Melamine, Acetic Acid Salt | + |
| 3 | Melamine HBr | + |
| 4 | Bis-melammonium pentate[1] | + |
| 5 | Melamine-formaldehyde resin | + |
| 6 | Benzoguanamine | + |
| 7 | Benzoguanamine phosphate | + |
| 8 | Ammeline | + |
| 9 | Cyanuric Acid | + |
| 10 | Glycine | + |
| 11 | Ammonium polyphosphate | + |
| 12 | Cyanamide | + |
| 13 | Urea | + |
| 14 | Guanidine HCl | + |
| 15 | Cyanoguanidine | + |
| 16 | Thiourea | + |

Notes:
[1]dipentaerythritol diphosphate salt of melamine; see U.S. Pat. No. 4,154,930

It will be apparent that mixtures of PEPA with a variety of nitrogen compounds are intumescent.

EXAMPLES 17–39

In the following Examples, compositions containing PEPA:Nitrogen Compound:Resin in a ratio of 1:1:1 were similarly prepared by simple mixing of the powdered resin with the PEPA/nitrogen composition Testing for intumescent behavior was again accomplished by placing a sample on the tip of a laboratory spoon and holding the sample on a bunsen burner flame for 5–10 sec. The compositions and intumescent behavior of these mixtures are summarized in Table II.

TABLE II
Intumescent Behavior of PEPA/Nitrogen Compound/Resin (1:1:1) Blends

| Example No. | Nitrogen Compound | Resin[1] | Intumescent[2] Behavior |
| --- | --- | --- | --- |
| 17 | Melamine | ABS | + |
| 18 | Melamine | SAN | Slight |
| 19 | Melamine | PolyCarbonate | + |
| 20 | Melamine | PVC | + |
| 21 | Melamine | PP | + |
| 22 | Melamine | PE | + |
| 23 | Ammonium Polyphosphate | ABS | + |
| 24 | Ammonium Polyphosphate | SAN | Slight |
| 25 | Ammonium Polyphosphate | PolyCarbonate | + |
| 26 | Ammonium Polyphosphate | PVC | + |
| 27 | Ammonium Polyphosphate | PP | + |
| 28 | Ammonium Polyphosphate | PE | + |
| 29 | Guanidine | ABS | + |
| 30 | " | SAN | + |
| 31 | " | PolyCarbonate | + |
| 32 | " | PVC | + |
| 33 | " | PP | + |
| 34 | " | PE | + |
| 35 | Glycine | ABS | V. Slight |
| 36 | " | PP | Slight |
| 37 | " | PE | Slight |

Notes:
[1]ABS = Styrene-Arylonitrile-butadine graft copolymer; SAN = Styrene-Acrylonitrile copolymer; Polycarbonate = bisphenol-A polycarbonate resin; PVC = polyvinyl chloride; PP = polypropylene; PE = polyethylene.
[2]+ = substantial char remains after burning; slight = only slight amount of char formation.

The variation of char forming character with resin type and nitrogen compound will be apparent from these data. Although PEPA/melamine and PEPA/ammonium polyphosphate mixtures are effective char formers in a variety of resins including polypropylene (Examples 21 and 27) and PVC (Examples 20 and 26), the same combinations produced only slight char formation in SAN (Examples 18 and 24). A mixture of PEPA and guanidine, however, was an effective char former in SAN (Example 30). Similarly, a PEPA/glycine mixture, in itself an effective intumescent was only slightly effective as a char-former when compounded with resins at this level (Examples 35–37).

EXAMPLES 38–48

In the following Examples, the flame retardant behavior of representative resin compositions containing mixtures of PEPA and nitrogen compounds as intumescent additives at various levels was measured by the UL-94 and LOI methods. The resin compositions were prepared by compounding the indicated resin in the mixing head of a Brabender extruder, then extruding the composition. The resin composition was then chopped and compression molded to form specimens for testing. The compositions and the UL-94 and LOI test results are summarized in Table III.

TABLE III

PEPA/Nitrogen Compounds as Flame Retardants

| Example No. | N-Compound | P/N[1] Ratio | Resin[2] | Loading[3] phr | UL94 Test | LOI | Intumescent |
|---|---|---|---|---|---|---|---|
| 38 | Melamine | 2.9/1 | PP | 30 | V-0 | 29.3 | + |
| 39 | " | 3.6/1 | PP | 30 | V-0 | 31.5 | + |
| 40 | " | 4/1 | PP | 22 | V-0 | 31.1 | + |
| 41 | " | 4/1 | PP | 20 | V-1 | 30.1 | + |
| 42 | " | 4/1 | Nylon 6 | 26 | V-0 | 27.5 | + |
| 43 | Melamine Phosphate | 1.6/1 | PP | 20 | V-0 | 29.8 | + |
| 44 | Melamine Phosphate | 1.5/1 | Styrene | 50 | V-0 | 29.7 | + |
| 45 | Melamine Phosphate | .8/1 | " | 45 | NVE | 22.3 | V. Light |
| 46 | Ammonium Polyphosphate | 1.5/1 | PP | 30 | V-0 | 29.5 | + |
| 47 | Benzoguanamine Phosphate | 1.5/1 | PP | 30 | V-2 | 26.8 | + |
| 48 | Melamine Cyanurate | 1.7/1 | PP | 30 | NVE | 30.6 | + |
| 49 | Melamine Phosphate | 1.5/1 | PMMA | 50 | V-0 | 36.5 | + |
| 50 | Melamine Phosphate | 1/1 | ABS/Nylon | 27.7 | V-0 | 29.6 | + |

Notes:
[1] P/N ratio = weight ratio of PEPA to nitrogen compound
[2] PP = polypropylene; ABS/Nylon = 100 pbw ABS, 30 pbw Nylon 6 alloy
[3] Loading = parts by weight of PEPA/N compound per hundred parts resin The ability of the intumescent compositions of this invention to impart intumescent and flame retardant character to resins is apparent from these data. Not all compositions produce flame retardant V-0 character to all resins. Thus, although compositions of Examples 41, 45, 47 and 48 exhibit intumescence and high LOI values, these resins were not rendered V-0. As will be apparent from a comparison of Examples 44 and 45, intumescent and flame retardant character is affected by the ratio of PEPA to nitrogen compound. Although some intumescent behavior will be seen in resins at some loading level for all P/N ratios, generally ratios of 1:1 and greater will be preferred.

The invention will thus be seen to be intumescent compositions comprising PEPA and a nitrogen compound which may be adapted to render polymeric resins intumescent and flame retardant.

I claim:

1. An intumescent composition comprising a resin selected from the group consisting of polyolefins, polyvinylaromatic resins, polycarbonate resins, polyacrylate resins, polyamides, polyvinyl chloride and blends thereof, 2,6,7-trioxa-1-phosphobicyclo [2.2.2.]octane-4-methanol-1-oxide and a nitrogen compound selected from the group consisting of melamine, ammeline, benzoguanidine, urea, guanidine and salts thereof.

2. An intumescent composition comprising a resin selected from the group consisting of polyolefins, polyvinylaromatic resins, polycarbonate resins, polyacrylate resins, polyamides, polyvinyl chloride and blends thereof, from 5 to 95 wt. % of 2,6,7-trioxa-1-phosphobicyclo [2.2.2.]-4-methanol-1-oxide and correspondingly from 95 to 5 wt. % of a nitrogen compound selected from the group consisting of melamine, ammeline, benzoguanidine, urea, guanidine and salts thereof.

* * * * *